US009678725B1

(12) United States Patent
Brezinsky et al.

(10) Patent No.: US 9,678,725 B1
(45) Date of Patent: *Jun. 13, 2017

(54) METHOD AND SYSTEM FOR SPECIFYING AND PROCESSING TELEPHONY SESSIONS

(71) Applicant: ShoreTel, Inc., Sunnyvale, CA (US)

(72) Inventors: Andrew M Brezinsky, New Berlin, WI (US); Andrew L Ortlieb, Wauwatosa, WI (US); Thomas J Kells, Brookfield, WI (US); Brian D Moe, Milwaukee, WI (US)

(73) Assignee: ShoreTel, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,043

(22) Filed: May 19, 2016

Related U.S. Application Data

(63) Continuation of application No. 14/605,373, filed on Jan. 26, 2015, now Pat. No. 9,350,864.

(60) Provisional application No. 61/946,034, filed on Feb. 28, 2014.

(51) Int. Cl.
| | |
|---|---|
| *H04M 3/00* | (2006.01) |
| *H04M 5/00* | (2006.01) |
| *H04M 3/51* | (2006.01) |
| *H04L 29/06* | (2006.01) |
| *H04M 7/00* | (2006.01) |
| *H04M 3/42* | (2006.01) |
| *G06F 9/44* | (2006.01) |
| *H04M 3/527* | (2006.01) |
| *G06F 9/45* | (2006.01) |

(52) U.S. Cl.
CPC .............. *G06F 8/34* (2013.01); *G06F 8/41* (2013.01); *H04M 3/527* (2013.01); *H04M 7/0021* (2013.01)

(58) Field of Classification Search
CPC ......... H04M 2203/15; H04M 2203/40; H04M 2203/402; H04M 2203/408; H04M 2203/407; H04M 2203/35
USPC ............ 379/265.09, 265.05, 265.01, 265.11, 379/265.13, 265.12, 266.01, 272
See application file for complete search history.

(56) References Cited

U.S. PATENT DOCUMENTS

| 6,587,867 | B1 * | 7/2003 | Miller .................... G06Q 20/10 705/38 |
| 8,838,707 | B2 * | 9/2014 | Lawson .................. G06F 9/542 709/206 |
| 9,077,805 | B2 * | 7/2015 | Wawrzynowicz .. H04M 3/5166 |

* cited by examiner

Primary Examiner — Thjuan K Addy
(74) Attorney, Agent, or Firm — Quarles & Brady LLP

(57) ABSTRACT

A method of processing telephony sessions for telephony clients, the method comprising the steps of providing a platform server operated by a service provider, the platform server programmed to perform the steps of storing at least one telephony application for each of a plurality of telephony clients of the service provider, receiving a call from a customer at the platform server to one of the telephony clients, identifying a telephony client associated with the received call, identifying an interactive telephony application associated with the telephony client and the received call and performing the identified interactive telephony application on the platform server on behalf of the identified telephony client and independent of any instructions from the telephony client.

20 Claims, 20 Drawing Sheets

Client 1 (Ace Automotive) Application Table

80 → Application ID
(Address for executable code)

82 → Application

| Application ID (Address for executable code) | Application |
|---|---|
| Dia587124-daa4802393-jv9032j | IVR Application 1 |
| D890d- sdfjnjos0009345soso30 | IVR Application 2 |
| 1ffmsod9803mfm-dfsd-834539-3 | Advanced App 1 |
| 839vnsdfd-f9sdd-fv0df8303cv-f9 | Simple IVR |

-- Simple IVR

230a → function start()
    channel.say("Welcome to simple.")
    return ask_for_digit
end 230b → function ask_for_digit()
    channel.say("Please enter a digit")
    return get_digit
end 232 → function get_digit()
    digit = channel.gather({maxDigits=1})
    return say_digit
end 230c → function say_digit()
    channel.say("You entered " .. digit)
    return hangup
end function hangup()
    -- Do nothing.  We will hangup when there is nothing to do
    return
end -- Run the IVR
current = start
while current do
    current = current()
end
234 → channel.hangup()

Fig. 11

```
-- Example showing one way to implement multiple languages.
--

------------------------------------------
-- Set up language related information -- Text table for TTS
--
text = {} -- Begin with an empty table.

-- Make sub-tables for each bit of language dependent text.
--
text.welcome_message= {
    ["en"] = "Welcome to Wally World",
    ["es"] = "Bienvenido al mundo de Wally"
} text.enter_zip_code = {
    ["en"] = "Please enter your zip code",
    ["es"] = "Introduzca su código postal"
}

-- Another way to make sub-tables.  This looks a little tidier.

text.good_bye = {}
text.good_bye.en = "Good bye"
text.good_bye.es = "Adios"

text.timeout = {}
text.timeout.en = "You took too long to answer"
text.timeout.es = "Usted tomó demasiado tiempo para responder"

text.max_attempts = {}
text.max_attempts.en = "You seem to be having problems"
text.max_attempts.es = "Usted parece estar teniendo problemas"

text.problem_getting_weather = {}
text.problem_getting_weather.en = "There was a problem retrieving the weather"
text.problem_getting_weather.es = "Hubo un problema al recuperar el tiempo"
```

Fig. 14a

```
text.problem_getting_language = {}
text.problem_getting_language.en = "You seem to be having a problem with this"
text.problem_getting_language.es = "Usted parece estar teniendo un problema con este"

text.system_error = {}
text.system_error.en = "We are very sorry, there seems to be a problem with our system"
text.system_error.es = "Lo sentimos mucho, parece que hay un problema con nuestro sistema de"

text.we_will_continue_in_language = {}
text.we_will_continue_in_language.en = "We will continue in English."
text.we_will_continue_in_language.es = "Vamos a continuar en español"

text.unknown_zip = {}
text.unknown_zip.en = "I don't think that was a real zip code"
text.unknown_zip.es = "No creo que eso fue un código postal verdadera"

-- Language dependent files.
--
files = {}
files.initial_option = {
    ["en"] = "initial_option_english.wav",
    ["es"] = "initial_option_spanish.wav"
}

-- Language dependent functions which assemble text from data
-- function weather_text_fahrenheit(city, state, temp)
    if language == 'en' then
        return "It is "..temp.." degrees Fahrenheit in "..city..", "..state
    elseif language == 'es' then
        return "Está a "..temp.." grados Fahrenheit en "..city..", "..state
    else
        -- Unknown language... this should not happen.  Give them English?
        return "It is "..temp.." degrees Fahrenheit in "..city..", "..state
    end
end
```

Fig. 14b

```
function weather_text_celsius(city, state, temp)
   if language == "es" then
      return "Eso es "..temp.." grados centigrados a la mayoria del mundo"
   else
      return "That's " .. temp .. " Celsius to most of the world"
   end
end -- Language Initialization function get_language(defaultLanguage)
   language = nil
   attempts = 0
   repeat
      channel.say("Press one for English", {lang='en'})
      channel.say("Aplastar dos para espanol", {lang='es'})
      digit = channel.gather({maxDigits=1})
      if digit == "1" then
         language = "en"
      elseif digit == "2" then
         language = "es"
      else
         channel.say("Please try again", {lang='en'})
         channel.say("Por favor, inténtalo de nuevo", {lang='es'})
      end
      attempts = attempts + 1
   until language or (attempts > 4)

if not language then
      language = defaultLanguage
      channel.say(text.problem_getting_language["en"], {lang="en"})
      channel.say(text.problem_getting_language["es"], {lang="es"})
      channel.say(text.we_will_continue_in_language[language], {lang=language})
   end return language
```

Fig. 14c

-- The IVR Itself

```
function begin_ivr()
    channel.say(text.welcome_message[language], {lang=language})
    channel.play(files.initial_option[language])
    return get_zip
end function get_zip()
    channel.say(text.enter_zip_code[language], {lang=language})
    zip, err = channel.gather({minDigits=5, maxDigits=5, delimiters="", timeout=60})
    if not zip then
        if err.type == "Timeout" then
            channel.say(text.timeout[language], {lang=language})
        elseif err.type == "MaxAttempts" then
            channel.say(text.max_attempts[language], {lang=language})
        else
            channel.say(text.system_error[language], {lang=language})
        end
        return
    end
    return get_weather
end function get_weather()
    weather_url = "http://wsf.cdyne.com/WeatherWS/Weather.asmx/GetCityWeatherByZIP?ZIP=" .. zip
    response, err = util.http.get(weather_url)

if not response then
        channel.say(text.problem_getting_weather[language], {lang=language})
        return
    end doc, err = util.xml.fromstring(response.content)

if not doc then
        channel.say(text.problem_getting_weather[language], {lang=language})
        return
    end
```

Fig. 14d

```
success, err = doc.find('.//{http://ws.cdyne.com/WeatherWS/}Success')
if success then
   if success.text == 'true' then
      city = doc.find('.//{http://ws.cdyne.com/WeatherWS/}City').text
      state = doc.find('.//{http://ws.cdyne.com/WeatherWS/}State').text
      temp = doc.find('.//{http://ws.cdyne.com/WeatherWS/}Temperature').text
      message = weather_text_fahrenheit(city, state, temp)
      -- fahrenheit = temp * 9 / 5 + 32
      celsius = (temp - 32) * 5 / 9
      celsius = math.floor(celsius*100) / 100
      message = message .. ". " .. weather_text_celsius(city, state, temp)
   else
      message = text.unknown_zip[language]
   end
else
   -- Problem processing retrieved data
   message = text.problem_getting_weather[language]
end
channel.say(message, {lang=language})
end
-- Set up and run the IVR
-- Language. It might be pre-set. If not, get it.
-- preferences will be set by the system -- configurable by the tenant. Or some human.
-- channel.var.language may have already been set previously by the caller in another IVR.
-- If neither of these have been set, prompt the user for language selection by calling get_language()
-- which is defined above in the language initialization section.

defaultLanguage = preference.get('defaultLanguage') or 'en'
language = channel.var.language or preference.get('language') or get_language(defaultLanguage)
current = begin_ivr
while current do
   current = current()
end channel.say(text.good_bye[language], {lang=language})
```

Fig. 14e

METHOD AND SYSTEM FOR SPECIFYING AND PROCESSING TELEPHONY SESSIONS

CROSS-REFERENCE TO RELATED APPLICATIONS

This application is a continuation of U.S. patent application Ser. No. 14/605,373, issued as U.S. Pat. No. 9,350,864 on May 24, 2016, which claims the benefit of priority from U.S. Provisional Patent Application Ser. No. 61/946,034, filed on Feb. 28, 2014, and entitled "METHOD AND SYSTEM FOR SPECIFYING AND PROCESSING TELEPHONY SESSIONS".

STATEMENT REGARDING FEDERALLY SPONSORED RESEARCH OR DEVELOPMENT

Not applicable.

BACKGROUND OF THE DISCLOSURE

The field of the invention is telephony systems and more specifically a system and method for specifying applications and controlling telephone sessions in the telephony field.

In an effort to reduce costs while still providing good service, many businesses have implemented interactive telephony (IT) systems that receive and handle customer phone calls in various ways. For instance, a customer calling a first bank may want to determine an account balance, authorize payment of two bills and also speak to a banking representative about how to arrange a wire transfer of funds from a second bank to the first bank. The account balance and bill payment activities can be handled using an IT system whereby a computer verbally interacts with a customer who responds in voice or via the number pad on a telephone device or another keyboard and the computer guides the customer through a "phone tree" to an application that will verbally announce the account balance and another application that enables the customer to authorize payment or the two bills. After the balance is obtained and the bills are paid, the customer can use the IT system to connect to a bank representative to discuss the wire transfer. Thus, most of the customer's needs can be achieved via a computer without requiring the customer to hold for a bank representative and without requiring human interaction. Overall these systems provide better customer service at a reduced cost and therefore increase competitiveness of the business.

Early IT systems were complex to set up and required highly skilled employees or consultants to develop different functionalities and therefore were relatively expensive to implement, maintain, and modify. For example, early systems required businesses to hire employees or consultants skilled in voice networking, codecs and hardware and services to bridge servers to public phone infrastructures and to train programmers in new software applications, tools and development environments that were, in most cases unrelated to the products and services provided by the businesses. In addition, businesses had to make large capital investments in hardware to run their IT systems.

One solution which appreciably reduces the costs of developing, maintaining and altering an IT system has been provided by third parties that act as intermediaries or gateways between a business and customers. To this end, instead of requiring a business to develop a complete IT application program, the intermediate third party develops reusable functional modules for carrying out different functions required by the IT application program. A business maintains high level application logic on a business server (e.g., a server operated by the business) and links to the functional modules on the third party server each time the application logic requires the process performed by one of the functional modules. Thus, for instance, one functional module may be designed to obtain a number input via a customer voice message where options include the numbers one through five for routing customers to different sections of a phone tree. Each functional module is accessible via a simple application program interface (API). Unless indicated otherwise, a third party server used to maintain and develop IT systems will be referred to as a gateway server and a business that uses a gateway server to provide IT services to customers will be referred to as an "end user" or "telephony client".

In addition to unloading expertise and hardware costs associated with an IT system onto an expert third party, existing gateway type systems have enabled web developers working for telephone clients to use their existing skills and tools to develop IT applications which makes IT application development as easy as web programming. For instance, in at least some cases a gateway enables a familiar web site visitor model to interact with a web developer's application. Within the model developers reuse existing tools and techniques including familiar concepts like HTTP redirects, accessing functional modules through an API and mime-type responses to construct complex IT applications.

In operation, when a customer calls a telephony client (e.g., a business that has contracted with a gateway for IT services), the gateway server intercepts the call, identifies the telephony client associated with the phone number used to initiate the call and uses a URL to link to a server controlled by the telephony client that starts the IT process. The gateway server and client server communicate via HTTP requests from the gateway server to the client server and HTTP responses from the client server to the gateway server where the requests provide information to the client server and the responses indicate next functional modules to perform per the high level IT application run by the client server.

While existing gateway type systems have proven useful in reducing expertise and capital outlays required by end users when implementing IT systems, existing gateway systems have several shortcomings. First, because the IT application logic is maintained by each telephone client that uses a gateway system, each telephone client still has to dedicate resources to the IT system. As an IT application becomes more complex, the resources required for a telephone client to maintain the IT application become greater. Similarly, as a business grows and more customers use a telephone client's IT system, the client has to dedicate more resources to capabilities to handle larger numbers of simultaneous calls from customers.

Second, IT application development still requires training in web programming tools. While many programmers are already trained in web application programming, many small businesses do not have programmers on staff and therefore third party consultants are often needed to develop an IT application which increases cost and may limit the ability of some small telephone clients to take advantage of a gateway system.

Third, there is delay each time a message is transmitted from a gateway to an telephone client server that runs an IT application. While the delays are short in many cases, the delays can be bothersome in at least some cases and therefore any solution that can reduce latency during a call would be useful.

Fourth, during programming an IT application using a gateway there is no easy way to test a portion of an IT application so that the developer can get a sense of what a customer will experience when the IT application is deployed. On the fly testing of application functions would be extremely useful and would enable a an application developer to test different activities and develop a better overall IT application for an telephone client.

BRIEF SUMMARY OF THE DISCLOSURE

It has been recognized that the gateway server in existing gateway type IT systems can be replaced by a platform server that performs many of the functions of a telephone client server in gateway type systems. Thus, for instance, the platform server can provide an application developers interface for use by client application developers for developing IT applications and can store and run essentially complete IT applications for telephone clients.

One advantage to having a platform server host entire IT applications is that telephone clients do not have to dedicate extensive resources (e.g. hardware) to their IT systems either initially or continually as their business and IT needs increase with larger customer bases. Another advantage to having a platform server host an entire IT application is that latency in call processes can be eliminated or at least substantially reduced by eliminating the need for requests and responses between a gateway server and an end user server.

In at least some cases a library of pre-canned functional modules are provided by the platform server that can be used to streamline and expedite the IT application development process. For instance, exemplary functional modules may include a "play" module used to play an audio clip or audio file instructing a customer to perform some action (e.g., "Please enter one to obtain an account balance, enter two to pay off a bill, enter three to transfer money, enter . . . ", a "gather digit" function for obtaining a number entered by a customer, a "say" function causing a voice synthesizer to generate speech corresponding to a text message, etc.

It has also been recognized that a graphical user interface (GUI) can be provided for telephone client application developers that is intuitive and can be used to develop IT application programs. In at least some cases the GUI may enable developers that have no understanding of web development tools to specify a complete IT application. After a developer specifies at least a portion of an IT application, in at least some embodiments the developer may be able to simulate the effects of the specified portion to test out the functionality of the system.

After a complete IT application has been specified via the GUI, the application can be "published" or compiled. To publish the application, a processor takes the visual representation of the application from the GUI and generates executable program code used to implement the IT application. The executable code is stored by the platform server to be executed whenever a customer places a call to an associated telephone client for service. In at least some embodiments the GUI may enable a developer to create a flow chart or block diagram that intuitively shows the flow of an IT application as the application is being developed.

In some cases the system will allow an application developer to use a standard scripting language with pre-defined API extensions to specify IT application code. One particularly advantageous language is the LUA programming language which is a light weight multi-paradigm scripting language. Here, a developer who knows the API extensions can program on their own local computer and then push the LUA program to the platform server. In other cases the platform server will provide a browser based interface for LUA programming and will store the resulting program for a telephone client immediately upon creation.

In some cases a developer may be able to choose between a GUI and a scripting language interface. In some cases after a GUI visual flow is published, the resulting code may be accessible via the scripting language interface to be modified.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 3 is a schematic diagram illustrating an exemplary client application table;

FIG. 11 shows executable code that may be generated by a platform server of FIG. 1 when the visual flow shown in FIG. 10 is published;

FIGS. 14a-14e are similar to FIG. 11, albeit showing executable code for a far more complex interactive telephony application;

DETAILED DESCRIPTION OF THE DISCLOSURE

Figure 1:
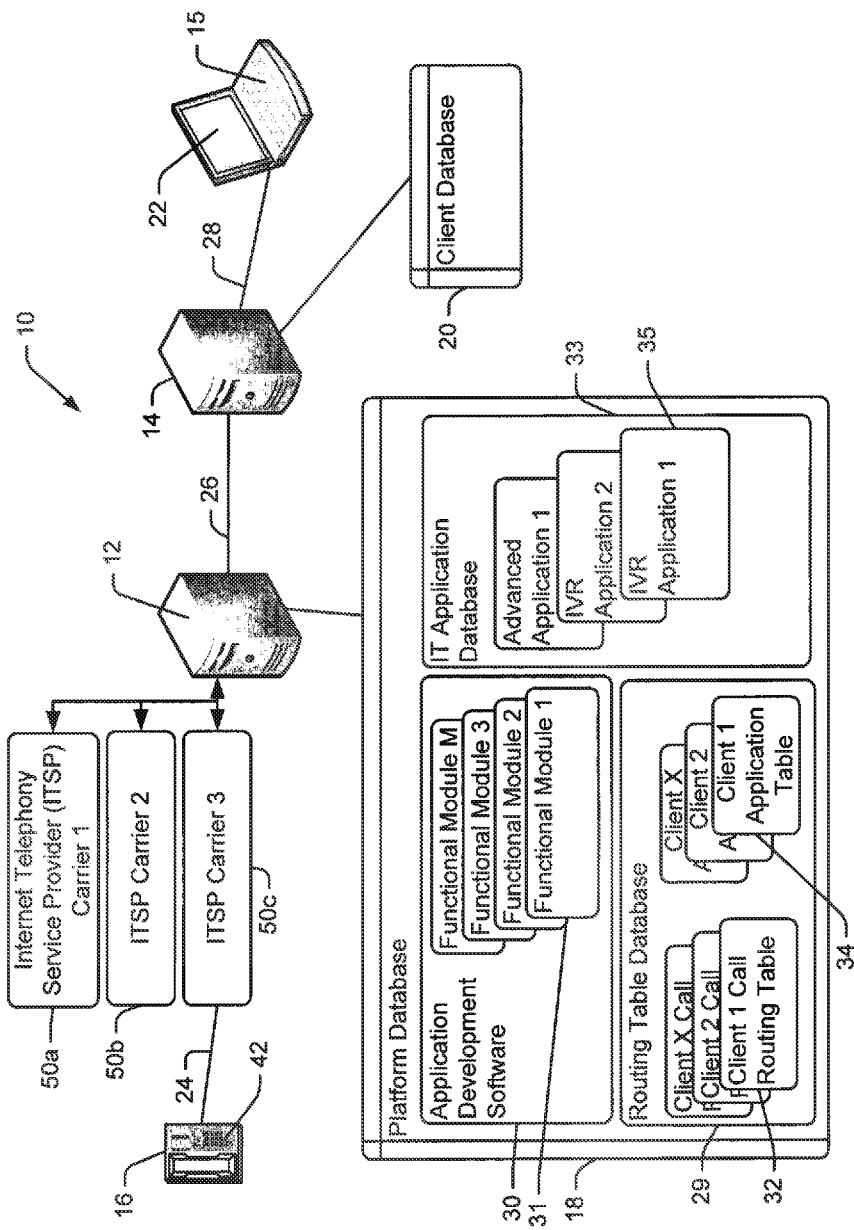
FIG. 1 is a schematic diagram illustrating exemplary components in a telephone system used to implement various methods and processes that are consistent with at least some aspects of the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary telephony system 10. In general, system 10 includes components that are controlled by three different entities including a telephony service provider, a service provider client or telephony client (e.g., a business that uses the services of the service provider) and client customers (e.g., persons that call in to a telephony system to receive some type of service from the telephony client). The general idea is that when a client customer calls a telephony client for some reason, the call is intercepted by the service provider and is handled by an interactive telephony (IT) system operated by the service provider. The call may ultimately be routed to a telephony client employee after interaction from the customer. Here, the service provider maintains applications customized for specific telephony client and runs one of the applications when a client customer calls the client. The system enables each telephony client to develop and edit their own customized applications with intuitive interfaces and/or using a standard and well known scripting language and a small set of extensions to the standard language that are easy to learn and understand. The LUA programming language is an exemplary scripting language that is particularly useful.

Referring still to FIG. 1, telephony system 10 includes a platform server 12, a client server 14, a platform database 18, a client database 20, customer communication devices 16, at least one client interface device 15 and several internet telephone service providers (ITSPs) or carriers 50a through 50c. Customer communication device 16 may be a standard telephone linked to a PSTN line, a wireless telephone, a cellular telephone, a computer capable of VOIP communication, etc. The exemplary device 16 includes a handset including a microphone for receiving voice input from a customer and a speaker for providing audible output to the customer. Device 16 also includes a key pad for entering numbers into the system. Where device 16 is linked to a PSTN line so that device 16 communicates via a common carrier communication protocol, the common carrier calls may be terminated by one of the carriers 50a through 50c upstream of platform server 12 so that the calls are handed over to server 12 using the session initiation protocol (SIP). Hereinafter, unless indicated otherwise, it will be assumed that all calls initiated by a customer device 16 and received at server 12 use SIP.

Client server 14 is operated by a telephony client (e.g., a service provider's customer) and may perform various processes and run various software programs required for the client to run its business. For instance, in the case of a full service automotive dealer, the software programs may manage automobile inventory, a service department, a parts department, a sales department, an accounting department, a procurement department, etc. As another instance, in the case of a bank, the software programs may manage customer saving accounts, bank loan accounts, real estate assets, legal matters, security, etc. Server 14 generates data while running programs and that data is stored in client database 20. The data in database 20 is accessed by server 14 for various purposes.

Client interface 15 can be any type of computer including a desktop, a laptop, a tablet type computing device, a smart phone, etc. The exemplary device 15 includes a keyboard for entering information and also a display screen 22. Device 15 is linked to client server 14 and can be used to run various applications required to manage the client's business. In addition to running business management applications, interface 15 may also be used by a client's employee or a third party contractor (hereinafter "a client developer") working for the client to develop an interactive telephony application. To this end, a client developer may use interface 15 to link to platform server 12 and access a browser based application development interface via screen 22 that can be used to specify a complete IT application as will be described in detail hereafter.

Referring still to FIG. 1, while server 12 is shown as a single server, the functions performed by server 12 may be performed by a set of cooperating servers that are provided and maintained by the service provider independent of the telephony clients. For instance, server 12 may include a database server, a web server, a telephony control server, an application development server, etc., that all cooperate the provide the functions of the platform server 12 described here. Server 12 receives SIP calls on line 24. Server 12 is linked via an internet or other network link to tenant server 14.

Platform server 12 is also linked to platform database 18 which stores development programs for developing tenant IT applications, applications specified using the development programs and data generated using the development programs and data generated when running the IT applications as well as other software used to manage overall server operation. To this end, database 18 stores application development programs 30 used by tenant developers to develop customized IT applications. The application development programs include functional modules collectively identified by numeral 31 that can be used by a developer to specify pre-canned functions for an application. For instance, if a developer wants an IT application to annunciate a greeting and initial instructions when a call is received, a "say" functional module 31 may be instantiated as part of an application where text entered into the functional module after selection is converted into a voice message when that functional module occurs in the flow of the application. As another instance, if a developer wants to collect a number entered into a keypad on a customer's device 16, a "gather digit" functional module 31 may be instantiated to obtain an entered digit and provide the digit to the application program for further processing. The functional modules are designed to be intuitive and will, in at least some cases, be limited in number so that learning how to use the modules is a trivial task for most client employees.

Figure 2:
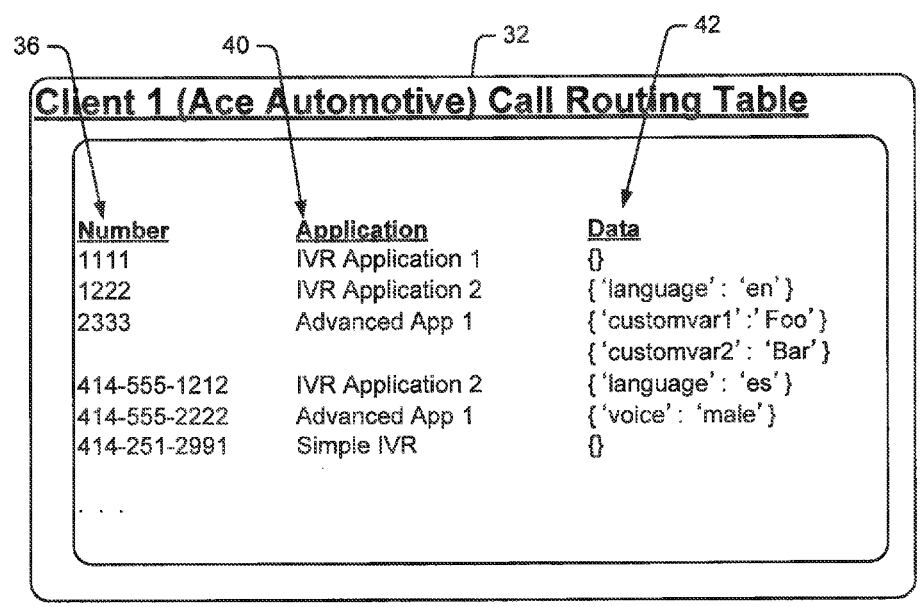
FIG. 2 is a schematic diagram illustrating an exemplary client call routing table.

Referring still to FIG. 1, platform database 18 also includes a routing table database 29 that includes client call routing tables 32. Routing table database 29 includes a separate call routing table for each of the service provider telephony client. Referring also to FIG. 2, an exemplary client call routing table 32 for a first client Ace Automotive is illustrated. The exemplary table 32 includes three columns of associated information including a number column 36, an application column 40 and a data column 42. The number column 36 includes a list of telephone numbers or extensions that are associated with the client. For instance, the last two numbers in column 36 correspond to direct dial telephone numbers while the top three numbers correspond to extensions. As seen, several numbers may be associated with a single client where each of the numbers corresponds to a different application. For instance, in the case of Ace Automotive, the client may have one general number to field general calls, a second number to contact a service department, a third number to contact a sales department, etc. Here, each of the different numbers may be associated with a different IT application.

Application column 40 lists a separate application for each of the numbers in column 36. For instance, an "IVR Application 1" corresponds to number "1111" in column 36, an "IVR Application 2" corresponds to number "1222" in column 36 and so on. Each of the applications is associated with a different interactive telephony process.

Data column 42 includes data that has been entered by a tenant application developer for each of the applications in column 40 where the data is useable to modify application functionality without altering the application itself. For instance, the data in column 42 can be used to specify a language (e.g., English, Spanish, etc.) to be used by the application, to set parameters to be used when the application is run, etc. For example, for the first instance of IVR Application 2 in column 40, the data in column 42 specifies the English language, for the first instance of Advanced App 1 in column 40, data in column 42 specifies two variable values Foo and Bar and for the second instance of Advanced App 1 in column 40 data in column 42 specifies that a male voice should be used when voice messages are broadcast. As shown in FIG. 2, In at least some cases a single application may be associated with two numbers in the same call routing table (see two instances of IVR Application 2 and two instance of Advanced App 1 in column 40.

Referring again to FIG. 1, platform database 18 also includes client application tables 34. Referring also to FIG. 3, an exemplary client application table 34 is illustrated that includes an application ID column 80 and an application column 82. The application column 82 includes a list of all of the IT applications that have been developed by an associated tenant (e.g., there is a separate application table for each service provider tenant). Exemplary applications in column 82 include IVR Application 1, IVR Application 2, Advanced App 1 and a simple IVR application. The ID column 80 points to a location in a database 33 (see again FIG. 1) that holds an execution code file for the associated application in column 82. Each application ID is unique and independent of which client developed the application. In at least some cases the application IDs are 'universally unique identifiers' so there is a guarantee that every application has a globally unique ID.

By storing the IT application code files independent of identity of the developing client, IT applications may be used by more than one client. For instance, a service provider may want to enable a second client to use a first application developed by a first client. In this case, the service provider may simply enter the unique application ID for the first application (e.g., the application developed by the first client) into an application table associated with the second client. This action makes the first application available for the second client to use but, in at least some cases, will disable the second client from being above to edit the first application.

Referring yet again to FIG. 1, platform database 18 further includes IT application database 33. Database 33 stores all of the IT applications (e.g., the executable code) 35 developed by the telephony clients and maintained by the service provider. Again, each of the developed IT applications will have a unique identifier that is independent of the client that generated the application. In addition, where a GUI was used to develop a visual flow of an application during application development, the visual flow representation may also be stored for subsequent access so that a client developer has the ability to use the simple GUI to edit an application if desired.

While FIG. 1 shows all of the software, routing and client application tables and applications 33 stored on a single platform database, other configurations are contemplated where the software, tables and applications are stored within a distributed database. For instance, one storage device may store the software programs run by server 12 during application development, a second device may store all of the route point tables and a third database device may store all of the applications developed by clients. In other cases subsets of the software, tables and applications may be stored on different distributed storage devices.

Referring again to FIG. 1, server or servers 12 include processors, memory and other hardware that cooperate to perform various functions. To this end, FIG. 4 includes a schematic of an exemplary server configuration 12 including internet protocol telephony switches 52, a message queue 54 and a plurality of channel coordination services (CCSs) 56a through 56d. The telephony switches 52 are linked to the carriers 50a through 50c and receive tenant customer calls there from and link those calls to specific CCSs through the message queue 54. As an IT application progresses and generates information to be conveyed to a client customer or as a client customer provides information back to the server 12, messages are placed into the scalable message queue 54 to be processed. Message queue 54 feeds the CCSs 56a through 56d.

Figure 4:
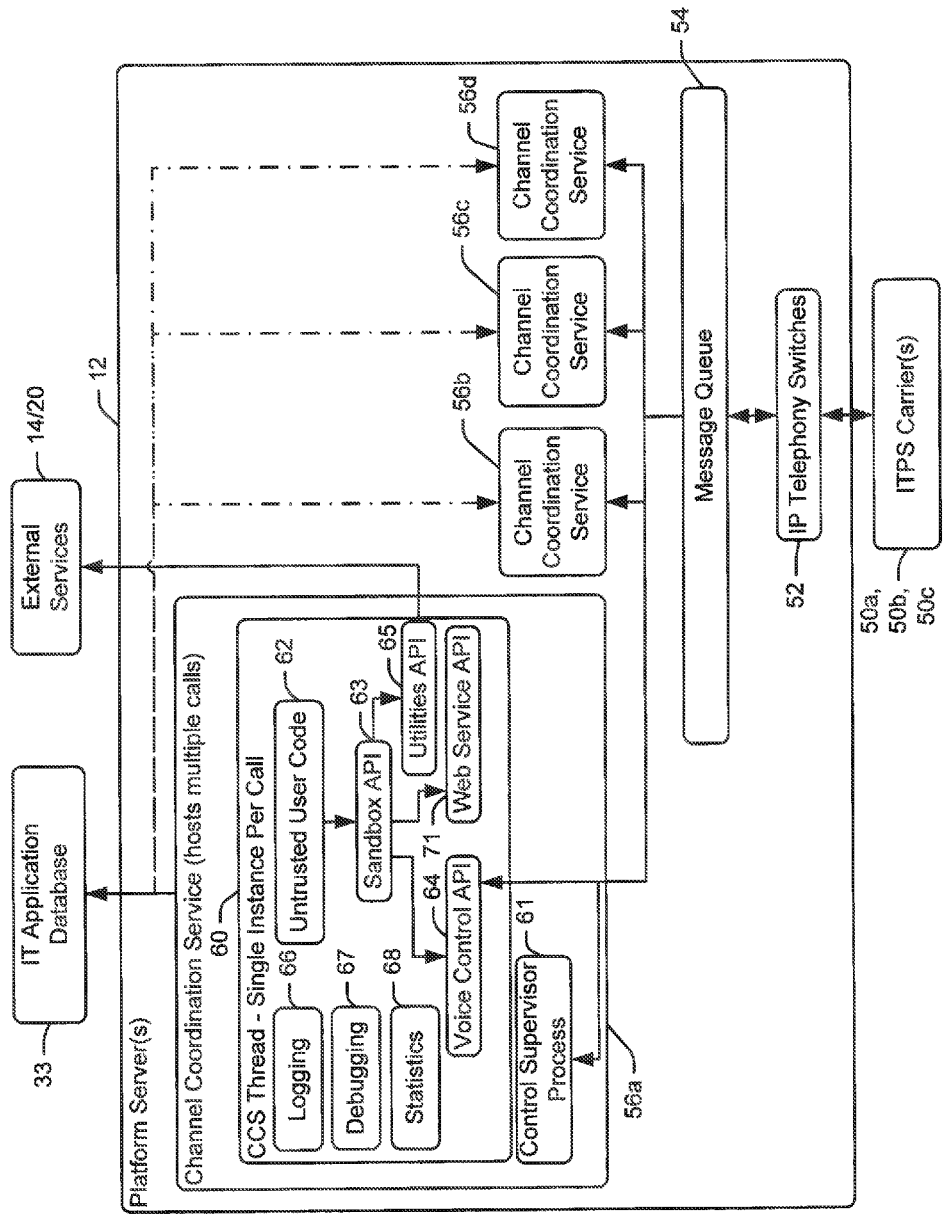
FIG. 4 is a schematic diagram illustrating functions and processes performed by the platform server shown in FIG. 1.

Referring still to FIG. 4, each of the CCSs 56a through 56d is similarly provided and operates in a similar fashion and therefore, in the interest of simplifying this explanation, only CCS 56a will be described in any detail. CCS 56a is provided by a server processor that runs software to facilitate CCS functions. Each CCS is capable of handling a plurality of simultaneous calls from one or more of the carriers 50a through 50c by simply opening up a separate CCS thread 60 for each of the calls. A control supervisor process 61 is run by server 12 to monitor execution of each of the CCS threads. In FIG. 4 the exemplary thread 60 includes un-trusted user code 62, a sandbox API 63, a voice control API 64, a utilities API 65 and a web services API 71.

Referring still to FIG. 4, when a call is received and assigned to one of the CCSs, after a thread is opened for the call, the CCS accesses the source code file 62 for the application associated with the called number and sets up the secure sandbox API 63 to execute the user code. Server 12 creates or instantiates a logging function 66, a debugging function 67, a statistics function 68, and other functions or services to track execution of the code. Finally the execution code for the application is processed starting at the top of the code file.

Any executable application code file will include commands that are part of the LUA or other programming language as well as other commands that were specified by a client developer or that result from actions by a client's customer linked to a call. Any code commands that were specified by a client developer or result from actions by a client's customer are considered un-trusted. All un-trusted code is passed through the sandbox API 63 where the un-trusted code is run in a secure manner that prohibits actions that are not known and supported by the system. To this end, the sandbox API performs security checks on the un-trusted code and makes sure the code is using API functions correctly. Where un-trusted code cannot be deciphered, the code is ignored and an error message may be generated. Where un-trusted code is understood, the code is either passed on to one of the voice control, the utilities or the web services APIs 64, 65 or 71, respectively, to be processed, or the function specified by the code is mapped into correctly formatted API calls that the system can use and the correctly formatted calls are passed on to API's 64, 65 or 71. For example, if executable code includes the command "channel.play('filename.mp3')", a LUA interpreter running the code would pass the play command on to the sandbox API. In the sandbox API, the play command is performed which takes in the argument 'filename.mp3' and makes sure that the file specified by the argument exists. If the file specified does not exist, the command is ignored. If the file specified exists, the sandbox API maps the command to the voice control API that actually plays the file.

Utilities API 65 is used to perform functions that have been defined by other sources such as a third party. For instance, a date parser functional module may be provided by a third party to be called via a utility API. A program to convert HTML documents to another form may be provided by another third party to be called via an API. Other utilities APIs are contemplated.

Web services API 71 is used to control web service calls to external services. For instance, if an application requires retrieval of data managed by a client server 14, a web service call may be generated using API 71 to link to server 14 to access the required data. As another instance, if a client customer wants to transfer money from one account to another, API 71 may be used to update or alter at least some data in a client's database 20 to reflect the transfer. The web services API may also be used to obtain data or change data maintained by a third party.

Figure 5:
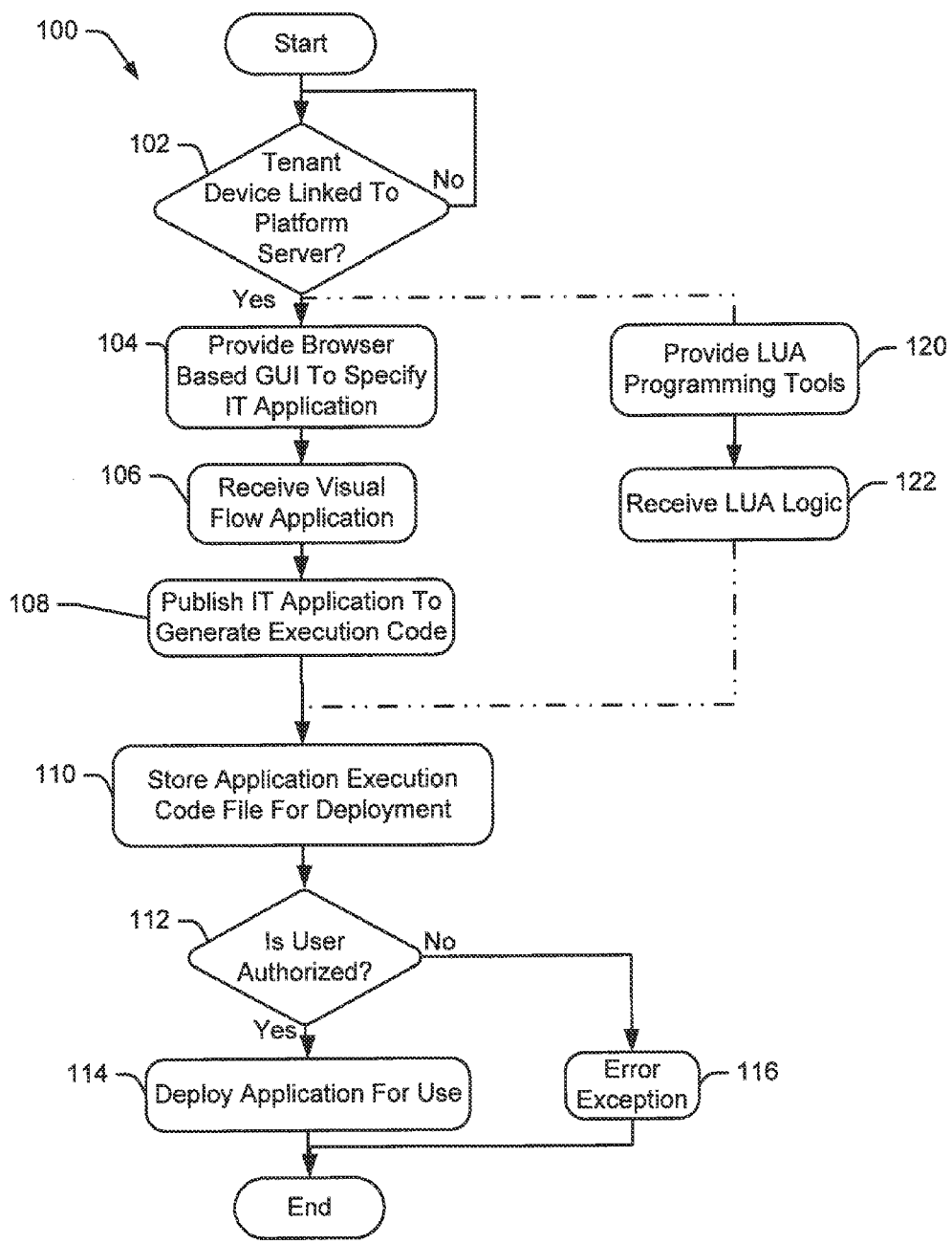
FIG. 5 is a flow chart illustrating a process for developing execution code corresponding to an interactive telephony application that may be facilitated by the platform server shown in FIG. 1.
Figure 6:
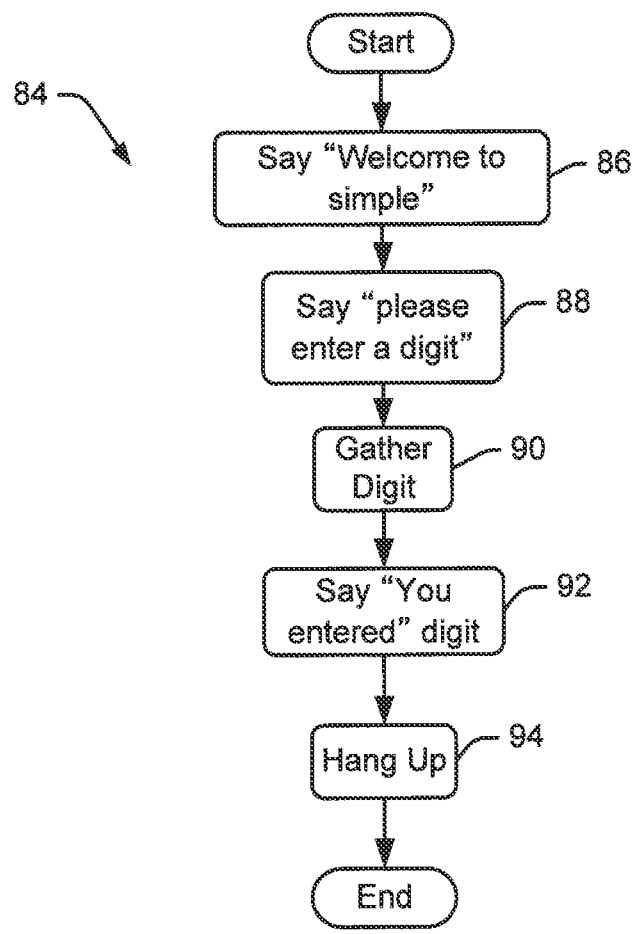
FIG. 6 is a simple flow chart illustrating a process to be implemented via an interactive telephony application.

Referring now to FIG. 5, a process or method 100 for developing an IT application that is consistent with at least some aspects of the present disclosure is illustrated. The process 100 will be described in the context of a process for developing an IT application to perform the simple IVR process shown in FIG. 6. To this end, FIG. 6 includes a follow chart showing an extremely simple exemplary interactive telephony process 84. In FIG. 6, when a customer call is received, at block 86 the phrase "Welcome to simple." is to be voiced as a message to the customer. At block 88 the phrase "Please enter a digit." is to be voiced as a message. At block 90 the process is to gather the digit entered by the customer. Here, in some cases the digit may be gathered as a digit selected via a customer device keypad or may be gathered as a voiced digit to be recognized by server software via voice recognition. At block 92 the process is to respond by confirming the digit entered by voicing the message "You entered _____", where the underline is replaced by the entered digit. At block 94 the process is to be completed when the system automatically hangs up on the call.

Referring again to FIG. 5, at block 102 the platform server 12 monitors for a client device 115 to link to the server via a browser internet link. Once a tenant device links to the server 12, in at least some embodiments, a browser screening will present the client developer with an option to select one of two different ways to develop the LUA execution code needed to perform the IT process (e.g., the simple process shown in FIG. 6). To this end, in at least some embodiments of the present disclosure, a developer will be able to develop an application by either using a graphical user interface (GUI) or by directly scripting LUA code. The GUI is designed to enable the developer to build a visual flow of the IT process that is similar to the flow chart shown in FIG. 6 and therefore is very intuitive and often can be used after only minimal training. After the visual flow is developed, the visual flow is compiled or published causing the platform server to convert the flow to LUA execution code. If a developer works in direct LUA code, the code is entered directly by the developer and no compiling is required.

Figure 7:
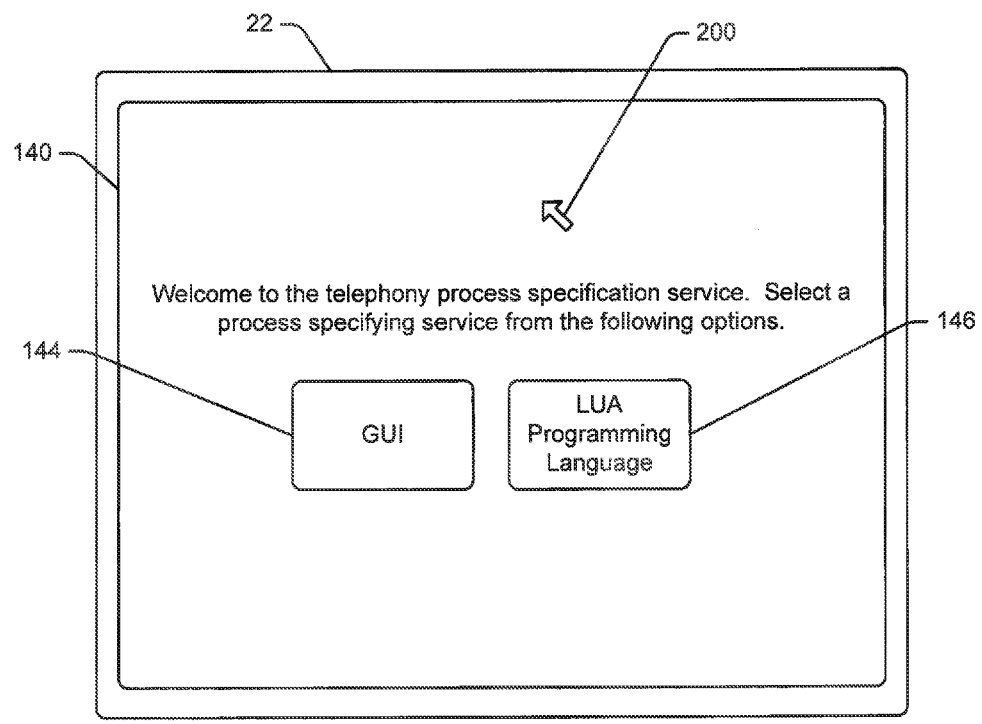
FIG. 7 is a schematic showing a greeting screen shot that may be presented to an application developer upon logging on to an application development web site provided by the platform server of FIG. 1.

FIG. 7 shows an exemplary browser screen shot 140 for greeting a tenant when the tenant initially logs onto the development system. As illustrated, the exemplary screen 140 includes a greeting and some simple instructions for the developer to get started. Here, two on-screen selectable icons 144 and 146 are provided that allow the developer to select one of the two ways to specify an IT application program. Icon 144 is a "GUI" icon which, when selected, provides the graphical user interface for graphically developing a visual flow. Icon 146 is a "LUA Programming Language" icon which, when selected, enables the developer to script LUA program code directly. An on screen pointer icon or cursor 200 is moveable about screen 22 and used to select either of icons 144 or 146. In this example it will be assumed that the developer selects the GUI icon 140 to access the graphical user interface and therefore, in FIG. 5, control passes to block 104 where a GUI is provided.

Figure 8:
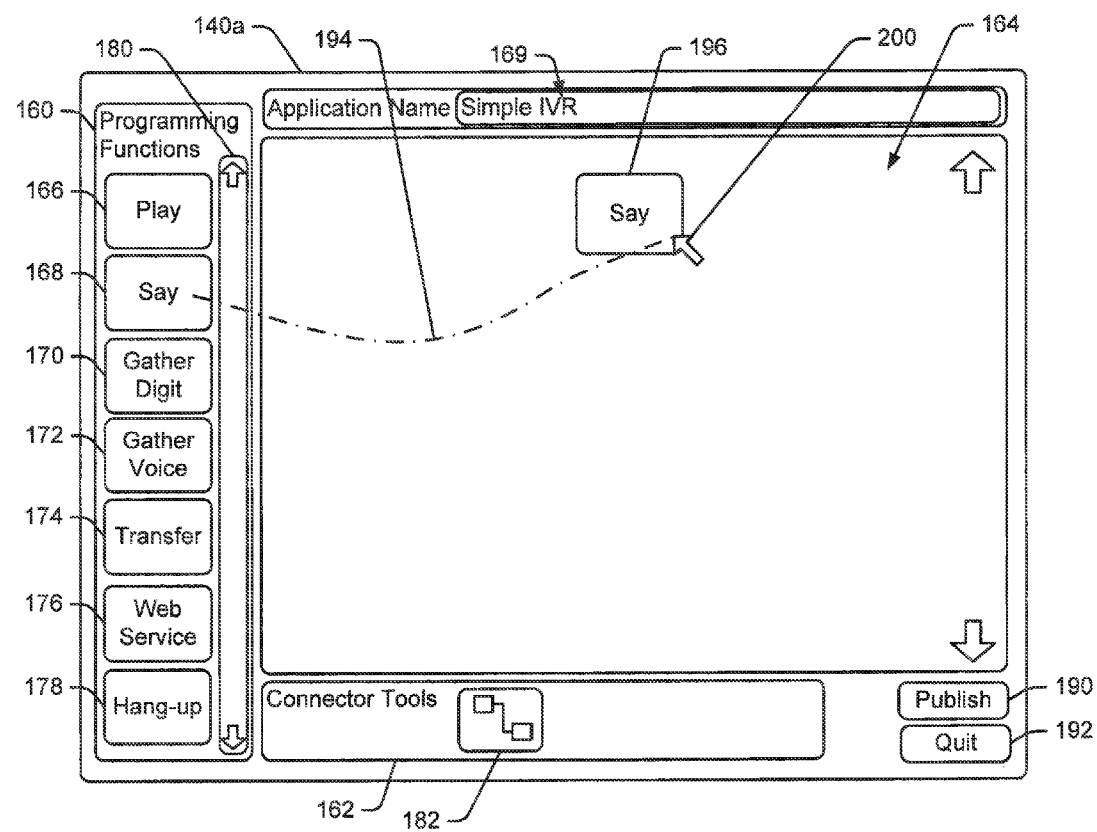
FIG. 8 is a schematic diagram illustrating another screen shot, albeit showing various tools to be used when developing an application.

Referring now to FIG. 8, an exemplary simplified GUI screen shot 140 is illustrated that includes a visual flow space 164, a programming functions tool bar 160, a connector tool bar 162, a name field 169, and publish and quit icons 190 and 192, respectively. Name field 169 is provided to receive a name for an IT application to be developed by a user. The application name can simply be entered into field 169. Often times the name entered into the field will be descriptive and have a clear meaning to the developer.

Visual flow space 164 is a space in which the developer can create the visual flow of an IT application by adding programming functions to the space, connecting the functions and adding properties to the functions. A set of functions are represented as separate blocks in tool bar 160 including a "Play" block 166, a "Say" block 168, a "Gather Digit" block 170, a "Gather Voice" block 172, a "Transfer" block 174, a "Web Service" block 176 and a "Hang-up" block 178. Other function blocks are contemplated and, where a full set of function blocks cannot be presented in the tool bar 160, a vertical scrolling tool 180 may be provided to scroll through the blocks.

Each of the blocks 166 through 178 can be selected to instantiate an instance of the associated function within visual flow space 164 to add the associated function to the application being developed. Block selection may include selecting a block with cursor 200 and dragging the block into space 164, double clicking on a block to create an instance of the block in space 164, etc. Once a block instance has been created, the block can be moved about in space 164, can be linked to other blocks, can be deleted, etc. At least some of the blocks can be customized by setting different characteristics as will be explained in greater detail below.

Referring still to FIG. 8, play block 166 can be used to cause server 12 to play an audio clip stored at a database address to a customer. Thus, for instance, if the phrase "Welcome to simple" is stored at a first database address, a play block specifying the first database address can be instantiated to play the phrase when the block occurs in an IT process. Say block 168 can be used to cause server 12 to convert text into a simulated voice message. For instance, a say block including the phrase "Welcome to simple." could be instantiated to have the server generate the phrase as a simulated voice message. The gather digit block 170 causes server 12 to receive a digit entered by a client customer. The transfer block 172 causes server 12 to transfer a customer call to another phone number or extension. For instance, where a customer selects the number "2" for service, a call may be transferred to a service extension.

The web service block 176 can be used by server 12 to access other functions performed by other servers. For instance, referring again to FIG. 1, while performing an IT application, platform server 12 may require some data from a client database 20 in order to complete a portion of the process. For instance, where a bank customer uses an IT application to requests an account balance from a client, the platform server 12 would have to obtain the balance information from the client's database. A request to a bank server 14 to access an account balance would be one web service. Other exemplary data retrieving web services may include obtaining weather data, obtaining information related to a service call, obtaining a stock quite from a brokerage firm, obtaining pricing information from a retailer, obtaining flight status information from an airline, etc.

In addition to being useful for retrieving data, a web service call may be used to modify, delete or add to data maintained by a third party. For instance, a customer may use an IT application to change a delivery data for furniture being delivered to the customer's home. Here, a web service call may be used to alter data in a delivery database. Other web services are contemplated.

Hang-up block 178 causes platform server 12 to hang up a customer call.

Connector tool toolbar 162 includes connector tools that can be used to link function block instances within space 164 together to form a visual flow. Only one exemplary connector tool 182 is shown but other tools are contemplated. Here, once a tool 182 is selected, cursor 200 takes on additional functionality and may be used to draw lines between blocks to specify process flow.

Publish icon 190 is selectable to submit the visual flow within space 164 to server 12 to be compiled into LUA execution code. Quit icon 192 can be selected to exit the developer's software program.

Figure 9:
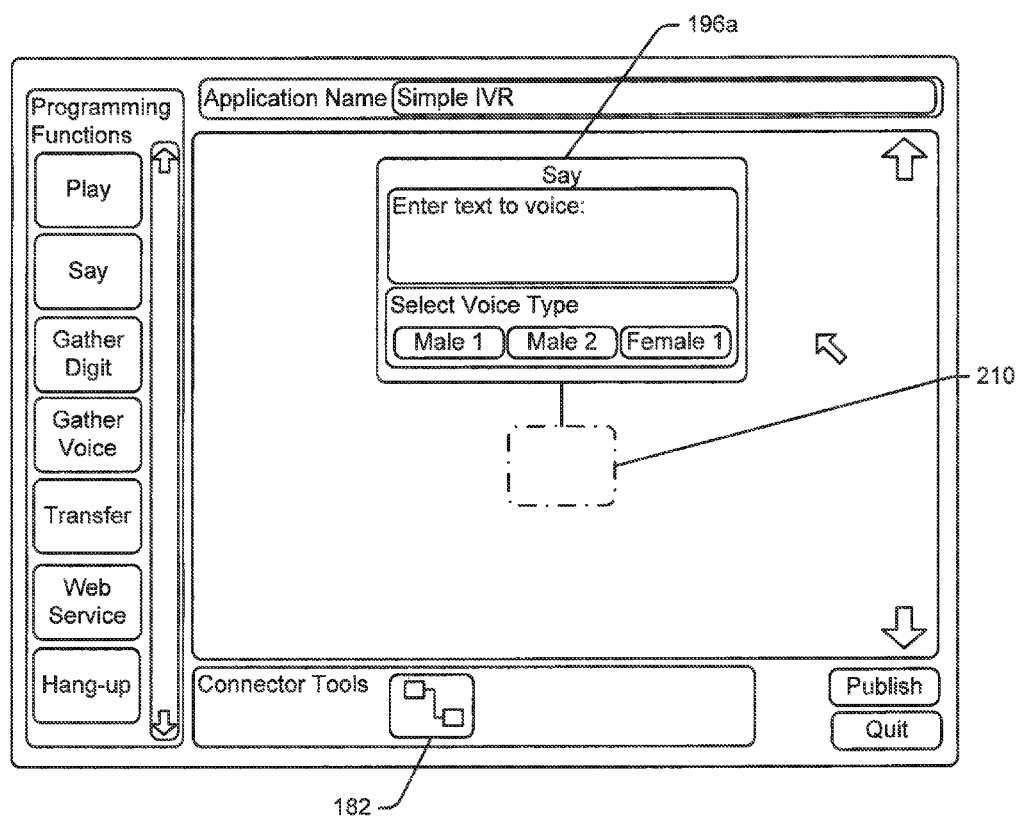
FIG. 9 is similar to FIG. 8, albeit showing a development process at a later stage.

Referring again to FIG. 5, at block 106 the developer uses the GUI to build up the IT application or process. To this end, see again FIG. 8 that shows initial step in specifying the IT application where a developer drags an instance 196 of the say function block into space 164 as shown at 194. Once block instance 196 is placed in space 164, in at least some cases, server 12 provides additional tools to guide the developer in specifying properties of the say function. In this regard see FIG. 9 where block 196 has been expanded (see 196a) upon placement to indicate other properties of the function that may be set. In the case of a say block, the most important additional information required is the text to be converted to the voice message. Thus, expanded block 196a includes a field for entering the text to be annunciated. Expanded block 196a also includes a field in which a developer can select different voice types including male 1, male 2, female 1, etc. Other property setting fields are contemplated.

In other embodiments, instead of expanding a placed cell to indicate additional properties that may be set, other interface tools may be used. For instance, in some cases when some additional information is required for a function like text to be voiced, upon placing the block a sub-window may be opened requesting entry of the text to be voiced or other required information. In other cases a sub-window may be opened upon clicking on a block instance or upon hovering cursor 200 over the instance to access tools for setting properties.

Referring again to FIG. 9, in addition to providing tools for setting other function properties, the GUI may also prod the developer by providing other graphical guidance. For instance, see that once block 196a is expanded, a next block 210 may be presented in phantom to prod the developer to add another block at the illustrated location where the next block is already linked via a line to the expanded block. Here, the developer would have the option to move a next block into the phantom space or to move a next block to any other location in space 164 and to use line tool 182 to manually link blocks.

Figure 10:
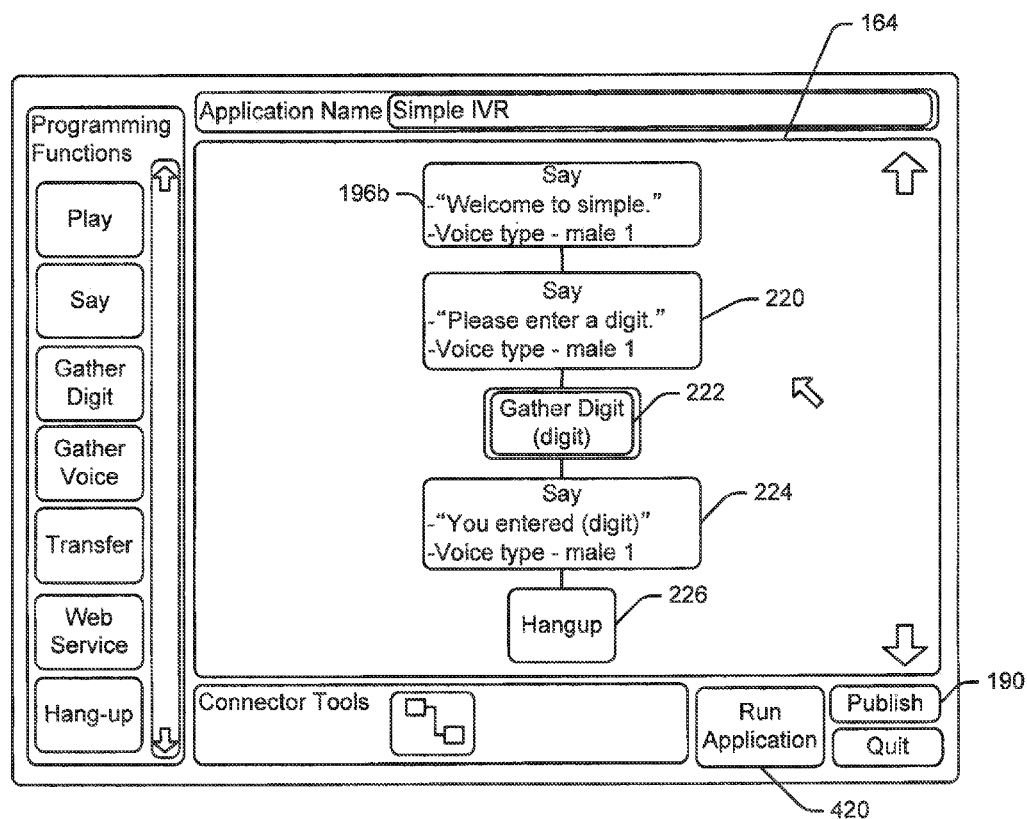
FIG. 10 is similar to FIG. 8, albeit showing a development process at a later stage.

Referring to FIG. 10, see that a developer has specified text "Welcome to simple." and a male voice for the first say block 196b, has added additional function blocks to the visual flow space, has specified properties for several of the function block instances and has linked the blocks together to form a single simple flow. The other blocks include two additional say blocks 220 and 224, a gather digit block 222 and a hang-up block 226. Once a block is added to a flow, a developer can modify the flow by deleting a block, adding new blocks, amending existing block properties, changing the flow between blocks, etc. Comparing the visual flow in FIG. 10 to the intuitive flow chart shown in FIG. 6, it should be appreciated that the visual flow in FIG. 10 substantially mirrors the intuitive flow chart in FIG. 6. Thus, the GUI should be very intuitive to use regardless of the amount of programming training a developer has received.

Referring again to FIG. 5, after the visual flow has been completely specified at block 106, at block 108 the developer publishes the flow (e.g., selects icon 190 in FIG. 10) causing platform server 12 to compile the flow into executable LUA code. The executable code is stored along with its name in a database in an undeployed state so that the application is not available for use.

To deploy application code for use, a developer has to push the executable code to the platform server for storage. When a developer attempts to push new code to the platform server, the server 12 requires the developer to securely log into the system and add the application and an associated number to the tenant's call routing table (see again FIG. 2). Secure access is controlled by a username and password log on process and a user may be required to enter an RSA or other public key to identify the user.

In FIG. 5, at block 112, the server 12 determines if a user is authorized to manage a tenant's IT application routing. If the user is not authorized, control passes to block 116 where an error message is sent to the user and the user is not allowed to change the routing table. If the user is authorized, control passes to block 114 where the user can access the routing table and add the application name and an associated phone or extension number to the tenant's call routing table. The client may also add data to column 42 (see again FIG. 2) to be used by an associated application when the associated number is called. Once the application is added to the routing table the application has been deployed.

Referring again to FIG. 5 and also to FIG. 7, if a client developer selects the LUA Programming Language icon 146, control passes from block 102 to block 120 in FIG. 5 where LUA programming tools are provided as part of a scripting interface (not illustrated). At block 122 the developer enters the LUA logic or code and at block 110 the completed LUA code is pushed to the server 12 for storage after which blocks 112 and 114 occur as described above.

Exemplary LUA execution code that may be published from a visual flow or may be directly entered via the LUA scripting interface that corresponds to the simple process shown in FIG. 6 is shown in FIG. 11. The code includes various API calls that cause application sub-functions to be performed such as "say" functions 230a, 230b, 230c, a "get digit" function 232 and a "hang-up" function 234. Again, the FIG. 11 code may be generated either by compiling a visual flow developed using a GUI interface or directly via scripting. Where a GUI interface is used to generate code, the visual flow may be stored along with the code or in some other database to be accessed subsequently if the application has to be edited in some fashion. After publishing a flow, the LUA code can be opened in a scripting interface to be modified.

Figure 12:
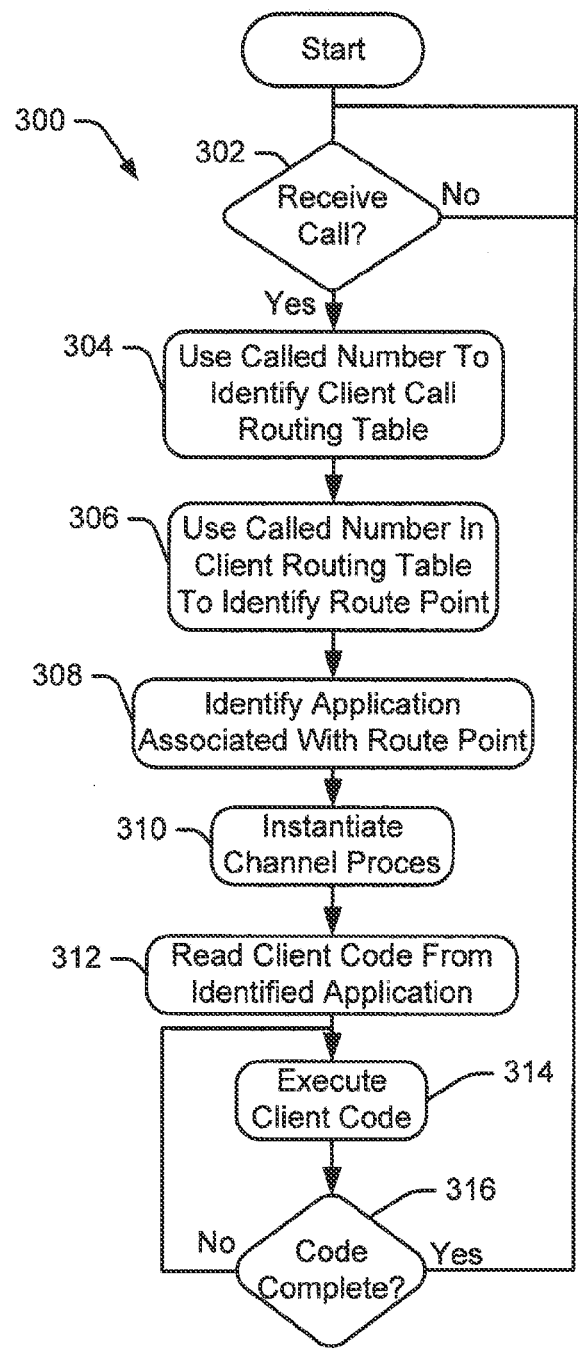
FIG. 12 is a flow chart showing a process for handling a call from a customer to a telephony client that ma ybe performed by the platform server of FIG. 1 that is consistent with at least some aspects of the present disclosure.

Referring now to FIG. 12, a process 300 facilitate an IT application when a customer calls a service provider telephony client is illustrated. At block 302, the platform server 12 monitors for an incoming call. Once a call is received, control passes to block 304 where the called number (or a client identifier provided by one of the ITSP carriers) is used to identify a client call routing table associated with the called client. At block 306 the called number is used to identify a route point for the call and at block 308 the application associated with the route point is identified in the routing table. At block 310 a channel process is instantiated by one of the CCSs 56a, 56b, etc., opening up a new CCS thread to handle the call. At block 312 the tenant code is read from the application identified at block 308 and the code is executed at block 314. Execution entails running untrusted user code in the CCS sandbox API 63 and performing API calls via APIs 64 and 65 (see again FIG. 4). The code executes until the call is completed at block 316 after which control passes back up to block 302 where the process continues to loop.

Figure 13:
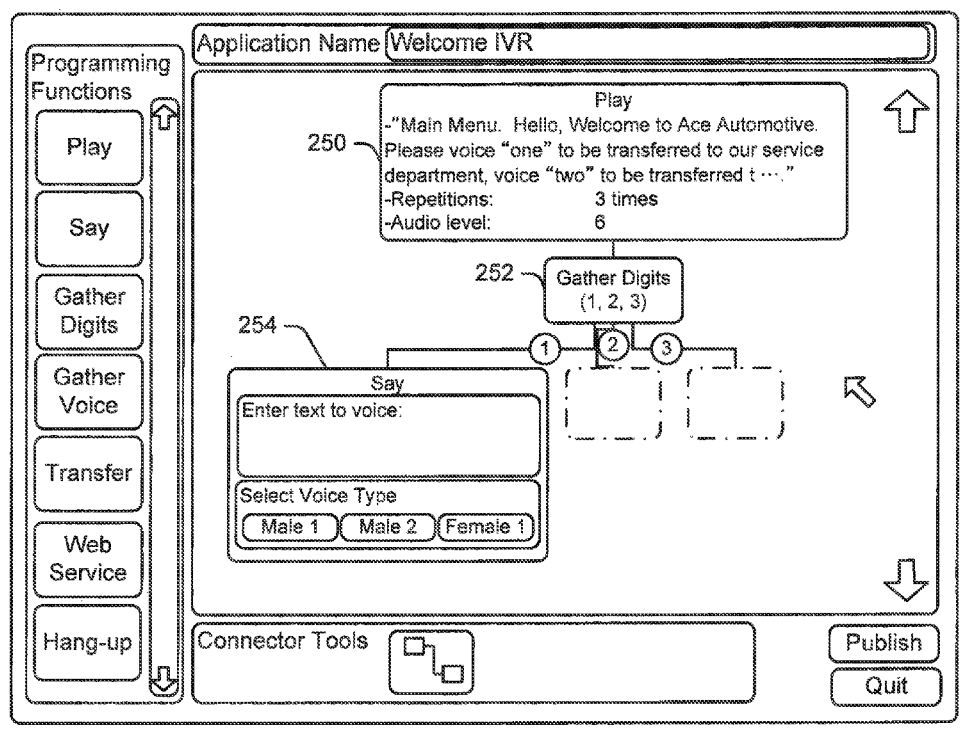
FIG. 13 is similar to FIG. 8, albeit showing a different visual flow being developed using the application development tool.

While a simple process is described above in relation to FIG. 5, it should be appreciated that far more complex processes and GUI and other tools for specifying those processes are contemplated. Referring now to FIG. 13, another screen shot similar to the screen shot shown in FIG. 10 is illustrated, albeit showing a different visual flow for a different portion of a IT application. Here the flow includes a play block 250, a gather digit block 252 and a say block 254. In the play block 250, other properties that have been set include a number of times to repeat the audio clip associated with the block and the volume level at which to play the clip. In this case the process branches out from the gather digit block in one of three directions depending on which digit is selected by the customer. For instance, a "1" selection leads to block 254 while other selections will lead to other blocks yet to be specified. Thus, the GUI can be used to specify relatively complex branching functions.

Referring to FIGS. 14a through 14e, another executable code file is illustrated which provides a bilingual application with support for dynamic translation. Additionally web service calls are used to obtain an provide temperature data from a third party service, to use utility functions to parse an XML response and to use math functions to convert Fahrenheit to Celsius.

In at least some embodiments it is contemplated that as a client developer uses one of the interfaces to specify a telephony application, the developer may be able to run the application in intermediate form to experience what a customer would experience when using the system. To run an application, an application code file has to be generated. Thus, when the GUI interface is used, the visual flow of an application has to be compiled prior to testing. In the case of the scripting interface, the code file already exists and therefore no compilation is required.

Figure 15:
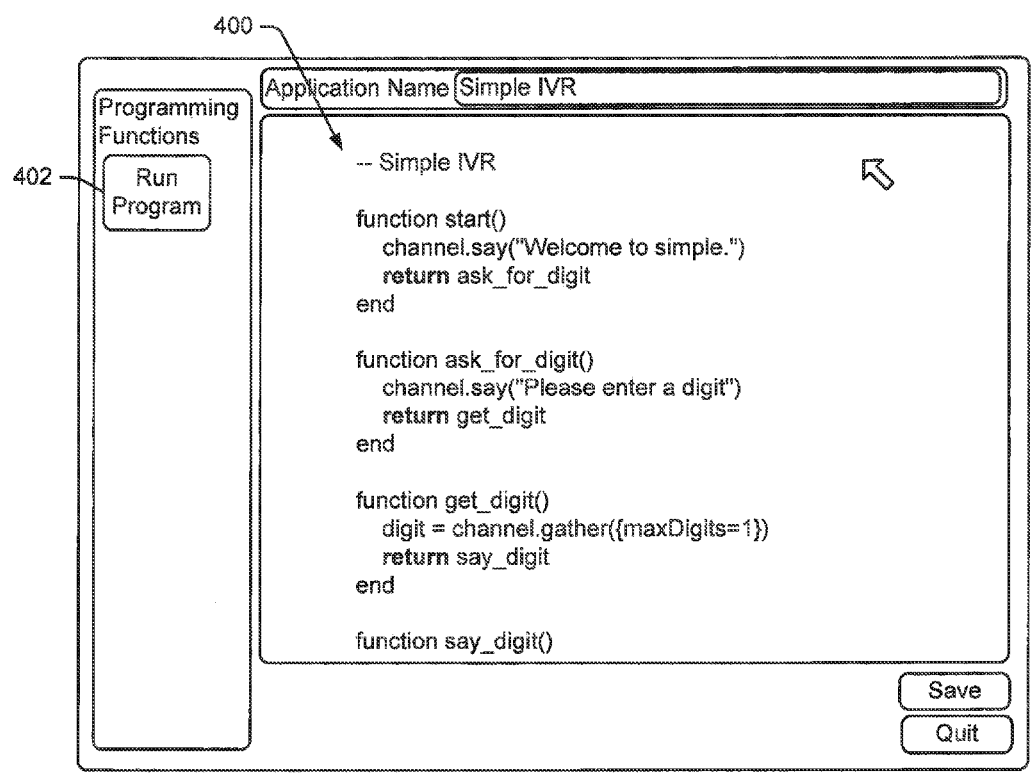
FIG. 15 is a screen shot showing a scripting interface that includes a run application icon for testing an application during development.
Figure 16:
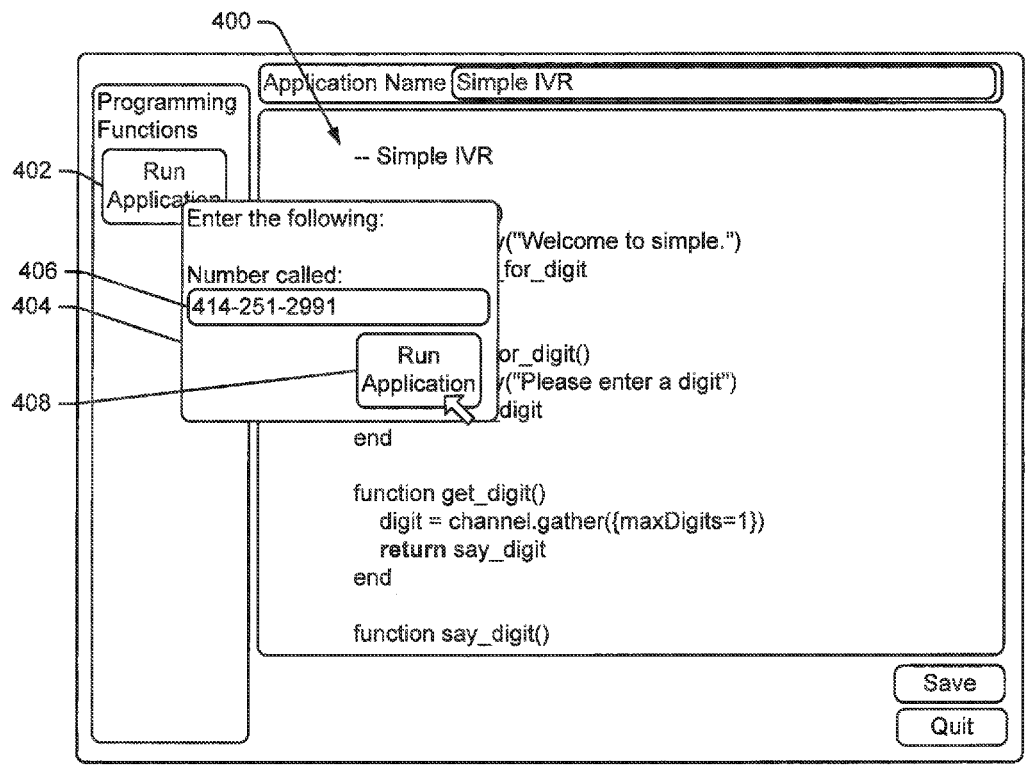
FIG. 16 is similar to FIG. 15, albeit showing a screen shot including a sub-window for entering information required when testing an application during development.

Referring to FIG. 15, an exemplary screen shot showing a scripting interface is illustrated where a portion of the simple IVR application code is shown at 400 within a scripting workspace. The interface includes a left edge tool bar that includes at least a "run application" icon 402 for testing the existing code in the workspace. Referring to FIG. 16, when icon 402 is selected, a query window 404 opens up and requests additional information required to run the application. For instance, in the case of the simple IVR, the additional information may only include a telephone number (e.g., a number to be called to initiate the application during the test activity) to be associated with the simple IVR application. In FIG. 16 a number field 406 is provided to enter a number. In other cases other information required to perform an application may be requested such as the time of day at which the call is to be simulated (e.g., some applications operate differently based on the time of day), the geographic location from which a call is to be initiated (e.g., some applications operate differently based on where a customer calls from), whether or not the call is initiated on a holiday, the date on which a call is initiated, etc.

Referring again to FIG. 16, window 404 includes a second run icon 408 that can be selected to run the application after required information has been entered. When the application is run, the developer uses a phone to call the number entered into field 406 and the platform server runs the application based on the other information that was entered using window 404 (e.g., date, time, location, etc.) so that the developer experiences the application.

Referring again to FIG. 10, in the case of the GUI interface, a run application icon 420 may be provided for testing. When icon 420 is selected, a window like window 404 in FIG. 16 may be opened to enter other required information. Once the second run icon 408 is selected, the platform server 12 compiles the visual flow into code and runs the immediately runs the code for the developer in a fashion similar to that described above. In this case, while the flow may be compiled to generate code to execute, the compiling and running of the code can be done behind the scenes so that the developer still sees the visual flow. In at leas some cases the interface may highlight function blocks on the developer's visual flow as the functional blocks are performed during the test simulation. To this end see that block 222 is highlighted to indicate that block 222 is currently being performed during a test.

A new interactive telephony or interactive voice recognition telephony system has been described where client developers can use either a GUI interface or a scripting language interface to develop LUA code or other familiar language code to specify customized and complex interactive telephony applications. Pre-developed functional modules are provided by a service provider that facilitate routinely useful functions which can be called via API calls from within applications. The telephony application programs are not run by clients themselves. Rather, after deployment, the application programs are stored and run by a platform server maintained by a telephony service provider. The service provider receives calls to the telephony client and facilitates client specified applications so the client need not dedicate substantial resources to facilitate interactive telephony services. The service provider uses web services to access client stored data and/or to change client stored data when necessary.

While the invention may be susceptible to various modifications and alternative forms, specific embodiments have been shown by way of example in the drawings and have been described in detail herein. However, it should be understood that the invention is not intended to be limited to the particular forms disclosed. For example, while the system is described above as one where a telephony client can develop an interactive telephony application using a browser based interface provided by a platform server operated by a service provider independent of the client, in other embodiments it is contemplated that a client may use a local LUA scripting interface that is independent of the service provider to develop LUA code. Here, the client developer can should be familiar with a set of API calls used to access code for performing functional sub-processes that are supported by the system so that those calls can be used within the LUA code. After a complete LUA code file is specified using the local interface, the client developer can push the code file to the service provider's server for storage, association with numbers in the client's routing table and ultimate deployment to be used to field calls from customers.

As another example, as briefly discussed above, the processes and functions performed by the platform server 12 may be distributed and performed by a set of cooperating servers. For instance, application development may be handled by one server, data storage may be handled by another server, running application code may be facilitate by a third server and so on. One important aspect here is that none of the platform server operations are performed by the telephony client.

Thus, the invention is to cover all modifications, equivalents, and alternatives falling within the spirit and scope of the invention as defined by the following appended claims.

To apprise the public of the scope of this invention, the following claims are made:

1. A method of processing telephony sessions for telephony clients, the method comprising the steps of:
providing a platform server operated by a service provider, the platform server programmed to perform the steps of:
providing an application developer interface for use by client application developers for developing IT applications; and
storing and running complete IT applications for telephony clients;
wherein the platform server is configured to substantially reduce latency in call processes by eliminating a need for requests or responses between a gateway server and an end user server.

2. The method of claim 1, the platform server further including a library of pre-canned functional modules.

3. The method of claim 1, further comprising publishing a complete IT application.

4. The method of claim 3, wherein the publishing step includes receiving a visual replication of the complete IT application from a graphical user interface and generating executable program code to implement the complete IT application.

5. The method of claim 3, wherein the publishing step includes receiving a visual representation of an at least partially complete IT application from a graphical user interface and generating executable program code to implement the IT application.

6. The method of claim 1 wherein the step of providing an application developer interface includes the steps of providing a graphical user interface including a visual flow space and a programming function toolbar, the toolbar including function blocks representing IT functional modules, the method further including the steps of receiving client application developer input via the interface selecting functional modules from the toolbar to instantiate function instances in the flow space and receiving client application developer input via the interface linking the instantiated function instances together to specify at least a portion of the complete IT application.

7. The method of claim 6 further including the steps of compiling the linked function instances in the flow space to generate IT application execution code.

8. The method of claim 7 further including the steps of receiving edits to the IT application execution code and storing the edited execution code as the IT application.

9. The method of claim 6 further including the steps of, after at least a portion of the complete IT application program has been specified, receiving a run command via the interface and running at least a portion of the complete IT application program in intermediate form.

10. The method of claim 9 further including the step of providing a phone number associated with the IT application program in intermediate form to the client application developer via the interface to be entered via a phone.

11. The method of claim 10 further including the step of, while the IT application program is running in intermediate form, presenting information via the interface indicating a current activity being performed by the IT application program.

12. The method of claim 11 further including presenting the IT application as a set of linked function blocks in the flow space and visually distinguishing a function block associated with a current activity being performed by the IT application program from other function blocks in the flow space.

13. The method of claim 11 further including the step of presenting the IT application as a code set in the flow space and visually distinguishing a sub-set of the presented code associated with a current activity being performed by the IT application program from other code in the flow space.

14. A method of processing telephony sessions for telephony clients, the method comprising the steps of:
   providing a platform server operated by a service provider, the platform server programmed to perform the steps of:
   providing an application developer interface for use by client application developers for developing IT applications, the application developer interface including a visual flow space and a programming function toolbar, the toolbar including function blocks representing IT functions,
   a. receiving client application developer input via the interface selecting IT functions from the toolbar to instantiate function block instances in the flow space; and
   b. storing and running complete IT applications for telephony clients that have been specified via the interface;
   c. wherein the platform server is configured to substantially reduce latency in call processes by eliminating a need for requests or responses between a gateway server and an end user server.

15. The method of claim 14 further including the step of receiving client application developer input via the interface linking the function block instances together within the flow space to specify at least a portion of the complete IT application.

16. The method of claim 15 further including the steps of receiving a command via the interface to publish a complete IT application and compiling the linked function block instances to generate executable program code associated with the complete application.

17. The method of claim 14 wherein the client application developer input is received during a development process and wherein the interface enables the client application developer to view operation of the IT application in an intermediate form during the development process.

18. A method of processing telephony sessions for telephony clients, the method comprising the steps of:
   providing a platform server operated by a service provider, the platform server programmed to perform the steps of:
   providing an application developer interface for use by client application developers for developing IT applications, the application developer interface including a visual flow space and a programming function toolbar, the toolbar including function blocks representing IT functions,
   a. receiving client application developer input via the interface selecting IT functions from the toolbar to instantiate function block instances in the flow space;
   b. receiving client application developer input via the interface linking the instantiated function block instances together to specify at least a portion of an IT application; and
   c. storing and running complete IT applications for telephony clients that have been specified via the interface;
   d. wherein the platform server is configured to substantially reduce latency in call processes by eliminating a need for requests or responses between a gateway server and an end user server.

19. The method of claim 18 further including the steps of, after at least a portion of the complete IT application program has been specified, receiving a run command via the interface and running at least a portion of the complete IT application program in intermediate form.

20. The method of claim 19 further including the step of providing a phone number associated with the IT application program in intermediate form to the client application developer via the interface to be entered via a phone.

* * * * *